United States Patent [19]

Bottom et al.

[11] Patent Number: 4,597,941

[45] Date of Patent: Jul. 1, 1986

[54] TOILET CLEANING ARTICLE AND METHOD FOR CODISPENSING DISINFECTANT AND DYE HAVING RESISTANCE TO SPECTRAL DEGRADATION

[75] Inventors: Carey B. Bottom, West Chester; Jane F. Gilmore, Fairfield; John L. Martin, Jr., Cincinnati, all of Ohio

[73] Assignee: The Drackett Company, Cincinnati, Ohio

[21] Appl. No.: 594,153

[22] Filed: Mar. 28, 1984

[51] Int. Cl.[4] ........................ A01N 29/00; E03D 9/02

[52] U.S. Cl. .......................................... 422/37; 4/227; 4/228; 422/266; 424/76

[58] Field of Search ................. 422/37, 261, 266, 274, 422/275, 276, 277; 4/222, 227, 228; 8/490, 525, 526, 463; 424/76

[56] References Cited

U.S. PATENT DOCUMENTS

| | | | |
|---|---|---|---|
| 434,493 | 8/1890 | Weinberg | 544/37 |
| 3,208,936 | 9/1965 | Hamilton | 252/1 |
| 3,318,815 | 5/1967 | Remler et al. | 252/106 |
| 3,355,392 | 11/1967 | Cantor et al. | 252/99 |
| 3,504,384 | 4/1970 | Radley et al. | 4/228 |
| 3,936,385 | 2/1976 | Cheng | 252/99 |
| 3,970,575 | 7/1976 | Barrett, Jr. | 252/95 |
| 4,200,606 | 4/1980 | Kitko | 422/37 |
| 4,208,747 | 6/1980 | Dirksing | 4/228 |
| 4,216,027 | 8/1980 | Wages | 134/36 |
| 4,229,410 | 10/1980 | Kosti | 422/28 |
| 4,238,192 | 12/1980 | Kandathil | 8/111 |
| 4,248,827 | 2/1981 | Kitko | 422/37 |
| 4,249,274 | 2/1981 | Kitko | 4/227 |
| 4,271,030 | 6/1981 | Brierly et al. | 252/98 |
| 4,308,625 | 1/1982 | Kitko | 4/288 |
| 4,353,866 | 10/1982 | Wong | 422/37 |
| 4,420,412 | 12/1983 | Wong | 252/186.38 |

FOREIGN PATENT DOCUMENTS 1035210 7/1966 United Kingdom .

1538857 1/1979 United Kingdom .

OTHER PUBLICATIONS

Chemical Abstracts, vol. 72, No. 4, 17246u, Jan. 26, 1970.

Colour Index, vol. 4, pp. 4469–4473, (Third Edition).

*Primary Examiner*—Arnold Turk
*Assistant Examiner*—Brion P. Heaney
*Attorney, Agent, or Firm*—Charles J. Zeller

[57] ABSTRACT

An article and method for disinfecting a toilet bowl and providing the bowl water with a blue tint or hue, which tint or hue resists oxidation by the disinfecting agent. The article comprises a first product chamber containing a first cleaning composition, said composition including the dye Color Index Dye No. 52,035, and a second product chamber containing a second cleaning composition including a disinfectant agent selected from the group consisting of 1,3-dibromo-5,5-dimethylhydantoin, 1,3-dichloro-5,5-dimethylhydantoin 1-bromo-3-chloro-5,5-dimethylhydantoin, dichloroisocyanuric acid and its sodium and potassium salts, and trichloroisocyanuric acid, the bowl water after the dispensing of the article having an available chlorine concentration of from about 0.1 to about 5.0 ppm, the weight ratio of available chlorine to dye being from about 1:1 to about 20:1. The Color Index Dye No. 52,035 is also resistant to attack by a hypochlorite ion-releasing disinfectant agent, for example, calcium hypochlorite and lithium hypochlorite, in the presence of ammonium ions contained in the water source at a concentration of from 0.05 to 2.5 ppm free ammonia, at the available chlorine and dye concentration stated above and at the stated ratios, and represents a further embodiment of the subject invention. The method comprises the step of codispensing a first solution containing the C.I. Dye No. 52,035 and a second solution of the disinfectant agent, to obtain the aforesaid concentrations and the aforesaid ratio of available chlorine to dye.

34 Claims, 5 Drawing Figures

TOILET CLEANING ARTICLE AND METHOD FOR CODISPENSING DISINFECTANT AND DYE HAVING RESISTANCE TO SPECTRAL DEGRADATION

FIELD OF INVENTION

The present invention relates to a dye resistant to chemical attack in dilute hypochlorite solutions. More specifically, the present invention relates to the incorporation and use of the Colour Index Dye No. 52,035 in an in-tank toilet cleaning article or dispenser, the article containing, for simultaneous but separate release into the toilet, a detergent composition including said dye and a hypohalite disinfectant composition, preferably a hypochlorite disinfectant, the dye being resistant to chemical attack by the released hypohalite ions, and by nitrogen containing chemical species that may be present in the residual toilet bowl water. Most specifically, the present invention relates to the incorporation and use of the stated dye in the toilet cleaning article, which article contains as the disinfectant a hypohalite ion forming agent selected from the group of dichloroisocyanuric acid and its sodium and potassium salts, trichloroisocyanuric acid, 1,3-dichloro-5,5-dimethylhydantoin, 1,3-dibromo-5,5-dimethylhydantoin, and 1-bromo-3-chloro-5,5-dimethylhydantoin, these agents forming under certain conditions nitrogen containing chemical species that are also oxidizing agents.

BACKGROUND OF INVENTION

In-tank cleaning articles that codispense both detergent and disinfectant cleaners are well known. See, for example, U.S. Pat. No. 3,504,384 to Radley, et al.; U.S. Pat. No. 4,208,747 to Dirksing; and U.S. Pat. No. 4,212,016 to Wages. Although nonhypohalite disinfectants may be employed as the disinfectant constituent in such codispensing articles, disinfectant tablets releasing hypohalite ions, preferably hypochlorite ions, are greatly preferred in terms of effectiveness, ease of manufacture, cost, delivery, and the like.

It is also preferred that the cleaner article deliver a dye to the bowl water, the presence of the dye indicating that the article is working and that the active materials have not been used up. In addition, the presence of a color in the bowl water is aesthetically pleasing to consumers, who have in the past demonstrated a preference for a blue tint or color of the bowl water.

U.S. Pat. Nos. 4,200,606 and 4,249,274, both to Kitko, disclose that the triarylmethane dyes FD&C Blue No. 1 (Colour Index Dye No. 42,090) and FD&C Green No. 3 (Colour Index Dye No. 42,053) are "stable" to hypochlorite ions under conditions stated therein. Thus, the color provided by FD&C Blue No. 1 is stated to be persistent when the bowl water hypochlorite ion concentration measured as available chlorine is between 2 to 10 ppm, when the dye concentration is between 0.5 to 5 ppm, and when the bowl water pH after a flush is from about 8 to about 9.5, the ratio of available chlorine to dye being from about 2:1 to about 6:1. At the same concentrations of disinfectant and dye, and at the same ratios thereof, FD&C Green No. 3 is stated to provide a persistent color when the pH of the bowl water after the flush is from about 8.5 to about 9.5. Unlike many dyes and unlike pigments, these dyes are not substantive to porcelain, and do not stain the bowl.

Although stated to be resistant to attack by hypochlorite ions, including hypochlorite ions formed by dissociation of chlorinated hydantoin compounds and trichloroisocyanuric acid, the Colour Index Dye No. 42,090 has, in fact, been found to be unsuitable for use in combination with these particular disinfectants. The water supplied to toilets has quite variable pH, depending on geographic location, ranging generally from between about 6.5 to about 10. In the case of trichloroisocyanuric acid, the delivery of this disinfectant to the bowl water lowers the pH of the water, in view of its acidic nature. Moreover, it has been found that trichloroisocyanuric acid undergoes, in aqueous solution, a slow dissociation to form chloramines and other nitrogen containing species. It is believed they attack the triarylmethane structure of the aforementioned dye. Formation of chloramines is believed to also occur with non-nitrogen containing disinfectants, for example, calcium hypochlorite, in the presence of ammonium ions, which ions are present in some water systems. Hence, in aged trichloroisocyanuric acid solutions containing its dissociation species, the C.I. Dye No. 42,090 has been observed to undergo attack in a wide range of pH from about 6 to at least about 9. During the reaction, that dye has been observed to undergo several color changes or shifts prior to a loss of color. Similarly, in the case of halogenated hydantoins, color shifting has been observed with C.I. Dye No. 42,090.

Although known to have general resistance to attack by hypochlorite ions, the dye of the present invention Colour Index Dye No. 52,035, has been found to be surprisingly resistant to hypohalite ions provided by dissociation of both halogenated hydantoin compounds and trichloroisocyanuric acid, notwithstanding the consequential formation of chloramines, over a broad range of pH. Similarly, said dye has been found to be resistant to attack in solutions containing calcium hypochlorite and ammonium ions, the presence of ammonium ions inducing the formation of chloramines. Moreover, Colour Index Dye No. 52,035 has been found not to stain porcelain, which is surprising in view of the staining tendencies of Methylene Blue, C.I. Dye No. 52,015, another blue dye in the triazine class.

SUMMARY OF THE INVENTION

It is an object of the present invention to provide an article for codispensing from separate chambers a first cleaning composition containing the dye Colour Index Dye No. 52,035 and a second cleaning composition containing a disinfectant, into the bowl water of a flush toilet, said dye being resistant to chemical attack by the disinfectant.

It is another object to provide a method for codispensing said first cleaning composition and said disinfectant.

It is a primary object to provide said dye in the detergent solution containing chamber of said article, which dye when dispensed into the toilet bowl is resistant to chemical attack in the presence of the disinfectant and notwithstanding the presence of nitrogen containing chemical species, whether such species result from dissociation products of the disinfectant or are present in the water supply.

It is yet a further object of the invention to provide a dye, Colour Index Dye No. 52,035, that shows good resistance to chemical attack in the presence of aged trichloroisocyanuric acid solutions.

These and other advantages of the present invention will be more completely understood upon a reading of the full specification, a summary of which follows.

The toilet cleaning article of the present invention is adapted for placement in a toilet tank and comprises a first product chamber containing a first solid cleaning composition including a dye which is Colour Index Dye No. 52,035; a second product chamber containing a second solid cleaning composition containing a disinfectant from which hypohalite, preferably hypochlorite, ions are released, said first and second product chambers each having means through which water enters the chambers during the refill of the tank and through which the respective solutions are separately codispensed during the flush of the tank, said solutions being formed in their respective product chambers in the quiescent period between refilling and emptying by partial dissolution of the compositions, said Colour Index Dye No. 52,035 being resistant to chemical attack by the disinfectant and by nitrogen containing chemical species, for example, mono-, di- and trichloramines formed as by-products of the dissociation of the disinfectant or by reaction with hypochlorite ions dispensed by the article and nitrogen containing chemical species present in the water supplied to the toilet, the article dispensing a quantity of each solution such that the bowl water concentration of the disinfectant is from about 2 to about 15 ppm measured as available chlorine, and of the dye is from about 0.1 to about 5.0 ppm on an active dye basis, the weight ratio of available chlorine to active dye being from about 1:1 to about 20:1, preferably from about 3:1 to about 12:1. Disinfectant agents incorporated into the article include calcium and lithium hypochlorites, halogenated hydantoins, and di- and trichloroisocyanuric acids, especially trichloroisocyanuric acid in tablet from comprising two to four parts trichloroisocyanuric acid and one part cyanuric acid. The calcium and lithium hypochlorites do not dissociate to form nitrogen containing chemical species, but react with such ammonia as may be found in the water supplied to the toilet to form such species, the Colour Index Dye No. 52,035 being resistant thereto at an ammonium ion concentration measured as free ammonia in the range in the bowl water after the flush of from about 0.05 to about 2.5 ppm.

The method of the present invention comprises the step of codispensing the first and second solutions into the toilet to obtain the concentration levels previously stated.

DETAILED DESCRIPTION OF THE INVENTION

Figure 1:
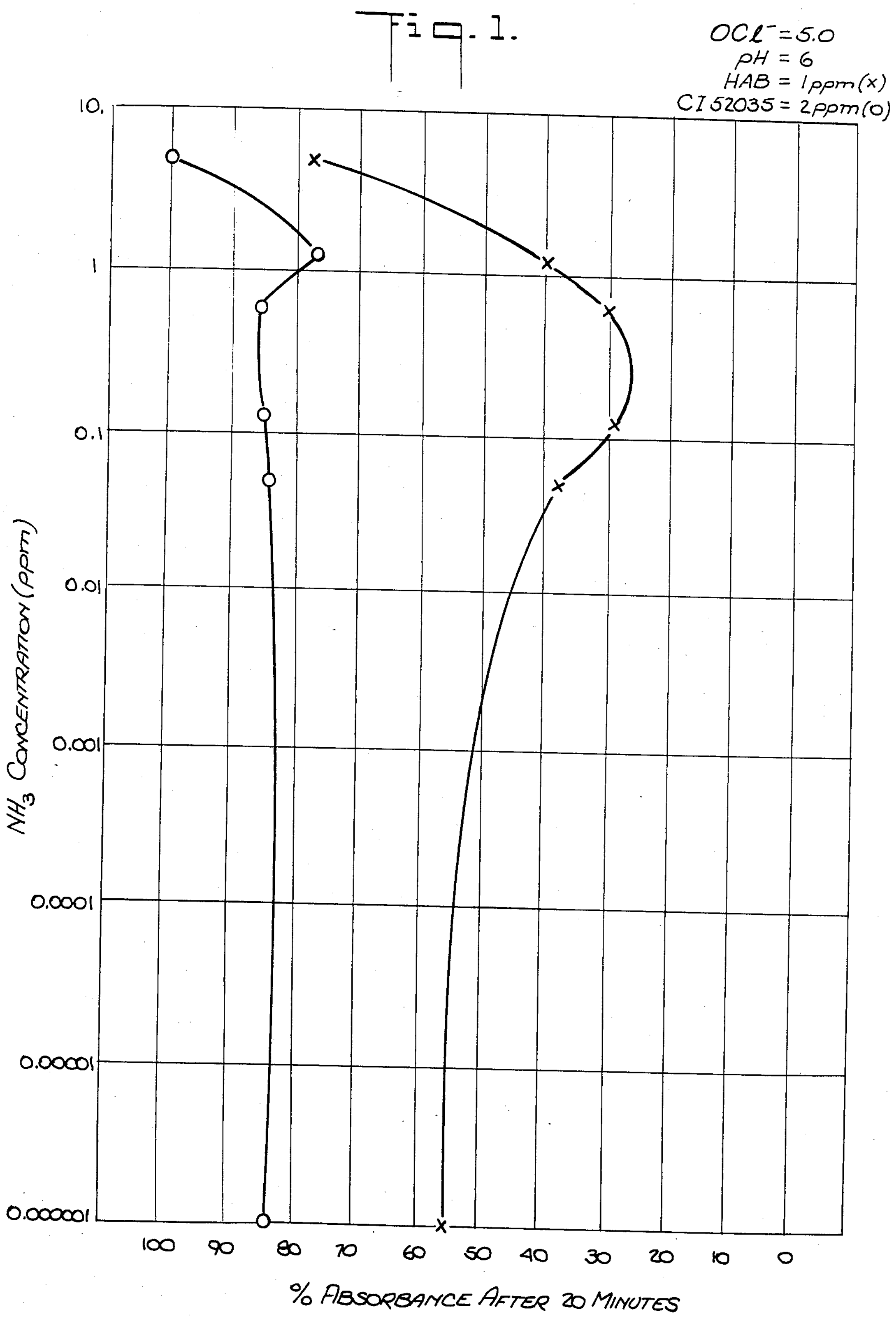
FIGS. 1 to 4 are graphs of ammonia concentration on the ordinate versus percent absorbance, for solutions containing 5 ppm available chlorine and a C.I. Dye No. 42,090 or a C.I. Dye No. 52,035, at various pH values of the solutions.

The toilet-cleaning article or dispenser of the present invention comprises a first chamber containing a detergent composition including the dye Colour Index Dye No. 52,035, and a second chamber containing a disinfectant composition including a hypohalite ion disinfectant constituent, said toilet-cleaning article being adapted for placement in the toilet tank of the toilet and codispensing separately when the toilet is flushed, concentrated detergent composition with said dye and concentrated disinfectant composition, from the respective article chambers for retention, as may be diluted, in the water retained in the toilet bowl.

The Colour Index Dye No. 52,035 is a thiazine dye discovered by Weinberg in 1890, having the structure:

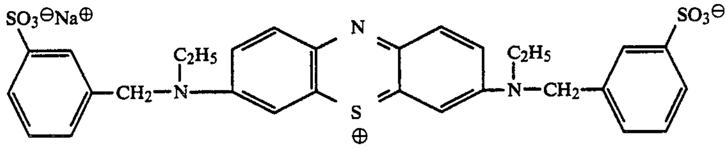

The dye is known to have a general resistance to attack from hypochlorite ions in dilute solutions. It is made by Hilton-Davis Chemical Company of Cincinnati, Ohio under the trademark Aqua Blue® NSCR, which commercial dye has an activity of about 60% pure dye. The concentration of active dye in Aqua Blue® NSCR is, for a 1 ppm aqueous solution, 0.93 μmol per liter. The dye may also be called Thiocarmine R, although is no longer manufactured under that commercial name.

The cleaning article delivers to the bowl water an effective amount of detergent constituents and an effective amount of disinfectant constituents, which effective amount of disinfectant is in the range of from about 2 to about 15 ppm, preferably from about 4 to about 10 ppm, measured as available chlorine in the bowl water.

The article or dispenser comprises a first product chamber, the chamber containing a first cleaning composition including said Colour Index Dye No. 52,035; a second product chamber containing a second cleaning composition including the disinfectant, and means for each chamber through which water enters the chambers during refill of the toilet tank and through which the respective solutions are separately codispensed during the flush of the tank. The first and second cleaning compositions are preferably solid, i.e., tablets or cakes, that dissolve slowly over time, and which form during the quiescent period between flushes, the cleaning solutions, which solutions are diluted when released into the tank water.

Preferably, the dispenser is provided with conduit means adapted to siphon the solutions within the respective chambers therefrom. Alternatively, the dispenser may be provided with conduit means that allow the solutions to be dispensed by gravity flow, the conduit means adapted to provide an air lock therein, to isolate the product chamber from the tank water during quiescent periods between flushes. Examples of dispenser structures suitable for codispensing the first and second cleaning solutions of the present invention are disclosed in U.S. Pat. No. 3,504,384 to Radley; U.S. Pat. No. 4,206,747 to Dirksing; U.S. Pat. No. 4,216,027 to Wages; U.S. Pat. No. 4,480,342 to Jones; U.S. Pat. No.

4,480,341 to Richards; U.S. Ser. No. 440,126 filed Nov. 8, 1982, by Richards, now abandoned; and U.S. Pat. No. 4,438,534 to Richards, et al.

Figure 5:
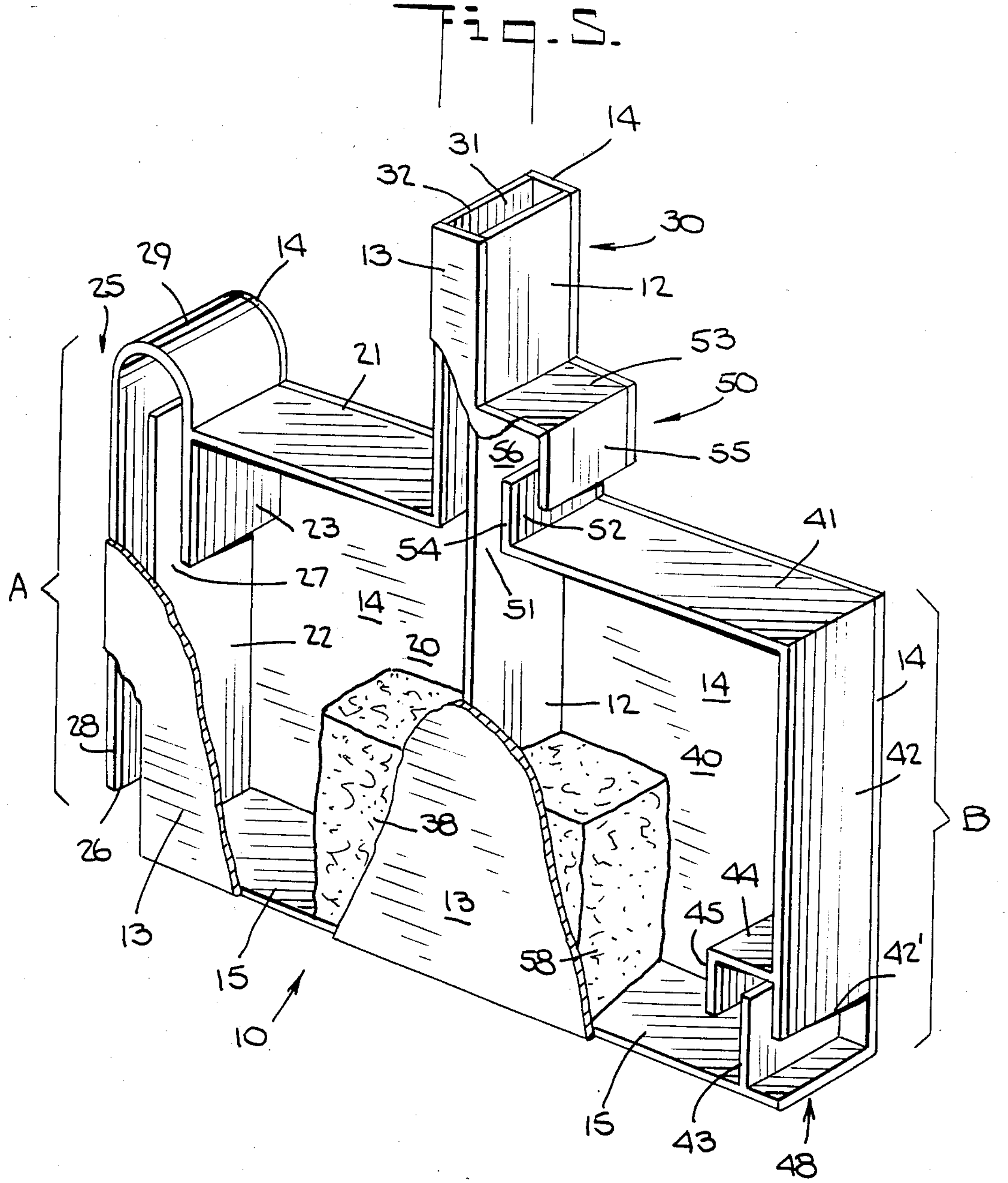
FIG. 5 is a perspective view of a tiolet cleaning article of the present invention.

The dispenser shown in FIG. 5 is exemplary of dispensers in accordance with the present invention. FIG. 5 is a perspective view of a dispenser 10 of the present invention, the front side wall of which is partially broken away to reveal the interior features of the dispenser. The dispenser 10 has two dispensing sections A and B, said sections being separated by common partition 12 of the dispenser 10. Front wall 13, back wall 14, and bottom wall 15 of the dispenser 10 are also common to each section A and B.

Dispensing section A comprises a product chamber 20 defined by partition 12, front wall 13, back wall 14, bottom wall 15, top wall 21, side wall 22 extending upwardly from bottom wall 15, and side partition 23 extending downwardly from top wall 21; an inlet/outlet pathway 25 having exterior conduit or leg 26 and interior conduit or leg 27, the pathway 25 being defined by front wall 13, back wall 14, side wall 22, partition 23, side wall 28, and arcuate wall member 29, and a vent conduit 30 having outlet port 31 in the top thereof, said vent extending upwardly from the top wall 21 to the atmosphere and being defined by common wall 12, front wall 13, back wall 14, and side wall section 32 opposite 12. The interior conduit 27 of the pathway 25 extends a finite distance below the top wall 21 of section A to define the volume of solution in chamber 20 that is ultimately dispensed. Solid dye-containing bar or cake 38 is disposed to chamber 20 of dispensing section A, the bar having such dimensions as not to occupy the entire interior space of said chamber 20.

Dispensing section B comprises a product chamber 40 defined by partition 12, front wall 13, back wall 14, bottom wall 15, top wall section 41, side wall 42, partition 43 extending upwardly from bottom wall 42, and partition 45 extending downwardly from partition 44, a refill/discharge pathway 48 defined by partitions 43, 44, and 45 and side wall segment 42', and an inverted U-shaped venting means 50 having an interior conduit 51 and an exterior conduit 52, said venting means 50 being defined by common wall 12, a partition 53 extending horizontally from wall 12, a partition 54 extending upwardly from top wall section 41, and a partition 55 extending downwardly from partition 53 and exteriorly of partition 54. Solid disinfectant bar or cake 58 is disposed in chamber 40 of dispensing section B, the bar having such dimensions as not to occupy the entire interior space of said chamber 40. As an alternate to the venting means 50 described above for section B, it is within the scope of the invention to vent section B by means of a vent conduit similar to the vent conduit 30 of section A.

The detergent constituents may be any conventional anionic or nonionic surfactants known to have cleaning effectivenes, for example those surfactants identified in U.S. Pat. No. 4,459,710 to George B. Keyes, et al., incorporated by reference. The disinfectant constituents incorporated in the article may be alkali metal hypochlorites, for example calcium and lithium hypochlorites and mixtures thereof; halogenated hydantoin compounds selected from the group consisting of 1-bromo-3-chloro-5,5-dimethylhydantoin, 1,3-dichloro-5,5-dimethylhydantoin, and 1,3-dibromo-5,5-dimethylhydantoin; dichloroisocyanuric acid and its sodium and potassium salts, and trichloroisocyanuric acid.

With respect to the disinfectant constituents, calcium and lithium hypochlorites are advantageous in that they are effective and are inexpensive. On the other hand, these disinfectants, when provided in the second chamber in the form of a tablet, have a tendency in aqueous environment to swell and the swelled tablet may interfere with the proper dispensing function of the cleaning article. In addition, tablets of these disinfectant constituents tend to disintegrate during use of the cleaning article, thereby exposing greater surface area of the composition and accelerating depletion of the tablet.

Disinfectants selected from the group consisting of 1,3-dibromo-5,5-dimethylhydantoin (DBDMH), 1,3-dichloro-5,5-dimethylhydantoin (DCDMH), and 1-bromo-3-chloro-5,5-dimethylhydantoin (BCDMH) and trichloroisocyanuric acid (TCICA) have been found not to have the drawbacks associated with the calcium and lithium hypochlorites. In the case of DBDMH and BCDMH it is believed that the active disinfecting species is the hypobromite ion, while in DCDMH it is the hypochlorite ion. Of course, BCDMH provides both hypobromite and hypochlorite ions in solution.

It is preferred that the cleaning article of the present invention dispense, in addition to the detergent and the disinfectant constituents, a dye that provides an indication that the article is functioning properly. Thus, the amount and release rate of the dye may be set to coincide with the depletion of the active cleaning constituents. Furthermore, the dispensing of dye into the bowl water provides color to the bowl water, which consumers have found to be aesthetically pleasing, especially those dyes that provide a blue tint or hue to the bowl water.

As indicated in the aforesaid '606 and '274 Kitko patents, dyes generally are oxidized by hypochlorite ion releasing disinfectant constituents. For this reason, any dye incorporated in a detergent and disinfectant releasing toilet cleaner article is incorporated in the detergent chamber. Notwithstanding segregation of dye from the disinfectant constituent in the article in this manner, when dye and disinfectant are co-released from the article into the bowl water, oxidation of dye present in the bowl water can occur.

The Kitko '606 and '274 patents disclose that the dyes FD&C Blue No. 1 (Colour Index Dye No. 42,090) and FD&C Green No. 3 (Colour Index Dye No. 42,053), both of which are triarylmethane dyes, are oxidized by hypochlorite ions, but at a reaction rate which provides a persistent color to the bowl water for several hours, at concentrations in the bowl water of 2 to 10 ppm for the hypochlorite ions (measured as available chlorine) and of 0.5 to 5 ppm for the dyes, the ratio of available chlorine concentration to dye concentration being from 2:1 to 6:1, provided the bowl water pH is from 8 to 9.5 for FD&C Blue No. 1 and 8.5 to 9.5 for FD&C Green No. 3. These dyes provide a persistent color, and under the conditions stated do not change color, according to these patents.

One drawback with the dyes disclosed in the Kitko patent is that the bowl water pH must be in the stated ranges, even though public water supply systems generally vary in pH from about 6.5 to about 10.0. Thus, a pH control agent may be required to ensure a proper pH.

Moreover, it has been found that Colour Index Dye No. 42,090 is not persistent and does change color when the disinfectant constituents are not calcium and lithium hypochlorites, but are the halogenated hydantoin and TCICA disinfectant constituents recited above. Fading of the color and/or the change in color attributable to oxidation by the hydantoin and TCICA disinfectant constituents has been found to occur not only at pH values of from 6 to 8, but also, under certain conditions hereinafter described, at higher pH values.

It is believed that the fading and changing of color associated with the C.I. Dye No. 42,090 when the disinfectant is TCICA or a halogenated hydantoin is attributable to nitrogen containing dissociation products of these disinfectants, in particular, di- and trichloramines.

Furthermore, it has been found that such non-nitrogen containing disinfectants such as calcium and lithium hypochlorite, in the presence of ammonia, also form these nitrogen containing compounds, in view of the reaction between hypochlorite ions and ammonium ions. In many water supplies ammonia is present naturally, while in some water systems, ammonia is added in the treatment. Inasmuch as the presence of ammonia in water systems occurs in many water systems nationwide, an article or dispenser containing a calcium or lithium hypochlorite or other such disinfectant, for nationwide use, should include a dye that resists chemical attack by this combination of chemical species that may actually be present in the bowl water after the flush.

In searching for a dye that is suitable for incorporation in a toilet cleaning article, the following criteria are important:

(1) the dye should exhibit reasonable resistance to oxidation from the disinfectant when the disinfectant has a concentration in the bowl water of from 2 to 15 ppm;

(2) reasonable resistance to oxidation should prevail over a wide pH range, preferably over the pH range of from about 6.5 to about 10, as this range includes the majority of water supplies extant;

(3) reasonable resistance to oxidation should prevail, notwithstanding the formation over time of any by-products, in view of dissociation of disinfectant in aqueous solution;

(4) reasonable resistance to oxidation should prevail, notwithstanding the presence of chemical species introduced by the water supply and that react with the disinfectant;

(5) by reasonable resistance to oxidation is meant that a dye should retain until colorlessness the tint or hue associated with its primary absorbance and, hence, should not reduce the primary absorbance to such extent that any secondary absorbances alter or change the desired tint or hue of bowl water color;

(6) by reasonable resistance to oxidation is further meant that loss of color (at the tint or hue associated with the primary absorbance) should not occur rapidly, fading to colorlessness taking place not earlier than about 30 minutes, preferably not earlier than about one hour, after the flush (i.e., the onset of reaction);

(7) very importantly, the dye should not be substantive to porcelain, any discoloration of the porcelain by the dye being at least easily removable merely by wiping with water. Preferably, the dye would not exhibit any staining or film deposition on a porcelain surface, and (8) the dye, in view of consumer preferences, should provide a primary absorbance that exhibits a blue tint or hue.

In searching for a dye in accordance with the above criteria, it was found that the thiazine dye Colour Index Dye No. 52,035 is suitable when the disinfectant is selected from the group consisting of 1,3-dibromo-5,5-dimethylhydantoin, 1,3-dichloro-5,5-dimethylhydantoin, 1-bromo-3-chloro-5,5-dimethylhydantoin, and di- and trichloroisocyanuric acids, at an initial concentration of said dye in the bowl water on an active basis of from about 0.1 to about 5.0 ppm, and when the hypohalite ion concentration is from about 2 to about 15 ppm measured as available chlorine, the weight ratio of available chlorine to active dye being from about 1:1 to about 20:1, preferably from about 3:1 to about 12:1. Preferably, the hypohalite concentration is from about 4 to 10 ppm, and the dye concentration is from about 0.3 to about 1.0 ppm. Similarly, it has been found that the C.I. Dye No. 52,035 is suitable when the water supply contains ammonia or other nitrogen containing species that react with hypohalite ions.

Prior to consideration of the subject dye, it was known that the C.I. Dye No. 52,035 exhibited a general resistance in the presence of only hypochlorite ions, but the quality of that resistance was unknown. Other dyes screened in various classes of dyes did not exhibit good resistance, or were found to be substantive with porcelain. Indeed, Methylene Blue (Colour Index Dye No. 52,015), which is another blue dye in the same thiazine class as the subject dye, C.I. Dye No. 52,035, was found to be highly substantive to porcelain, the stain produced thereby not being easily removable even with vigorous scrubbing. It is known that C.I. Dye No. 42,090, a dye long used in commercial toilet bowl cleaner articles that do not release a disinfectant, is not substantive to porcelain. The subject thiazine dye is manufactured by Hilton-Davis Chemical Company under the trade name Aqua Blue® NSCR, and is about 60% active dye.

As compared to Colour Index Dye No. 42,090, sold as Hidacid Azure Blue (trademark Hilton-Davis Chemical Company, 67% active dye), the color provided by an equal weight of the subject dye is about two to three times less intense. Hence, to achieve the same tinctorial value, it is necessary to use more dye than C.I. Dye No. 42,090. As will be seen, however, the subject dye resists attack by oxidation as defined by criteria 1-6 in a manner that is surprisingly superior to C.I. Dye No. 42,090.

Inasmuch as the '606 Kitko patent discloses that FD&C Blue No. 1 dye (C.I. Dye No. 42,090, 90% active dye) is persistent in hypochlorite ions obtained from a large array of disinfectant materials, including trichloroisocyanuric acid and hydantoins, it was quite surprising to observe that a solution (Solution A) containing 1 ppm Hidacid Azure Blue dye (C.I. Dye No. 42,090 manufactured by Hilton-Davis) was oxidized in a trichloroisocyanuric acid solution of 10 ppm available chlorine (pH of 7.3) from an initially blue color to a transitional peach or pink color. Although the hypochlorite ion concentration, hypochlorite ion/dye ratio, and pH of Solution A were outside the ranges disclosed in the '606 patent, other TCICA solutions of the same pH and concentrations as Solution A did not behave similarly.

Investigation as to the probable cause of the color shift to the pink or peach noted above indicated that the Solution A referred to above had not been freshly prepared, while said other solutions were tested immediately upon preparation. Spectroscopic analysis indicated that Solution A after achieving the peach or pink color had little absorbance characteristic of a blue tint, but showed significant absorbance in the range of 400 to 500 nm, characteristic of yellow.

Further analysis of aged TCICA solutions led to the speculation that such solutions contained chemical species not found in the freshly made TCICA solutions. Thus, trichloroisocyanuric acid, which has the formula:

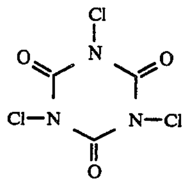

was found in aged solution to contain mono-, di-, and trichloramines, ammonia and ammonium ions. Other N-chloro species may have been present. It is believed that it is these nitrogen-containing species that affect the rate and nature of the attack of the triarylmethane dyes. Such chemical species are likely to form from TCICA in a toilet dispenser when left standing for a period of time, these chemical species then being dispensed to the bowl water where oxidation of dye can occur. These chemical species also are formed with disinfectants such as calcium hypochlorite and lithium hypochlorite, when ammonium ions are provided from without the dispenser, i.e., introduction by the water supply. For public water supplies the mean maximum for $NH_4^+$ ions is 1.1 mg/l (1.1 ppm) with a mean minimum of 0.13 mg/l. (0.13 ppm), measured as N. The median maximum is 0.15 mg/l, while the median minimum is 0.01 mg/l. (Committee Report, Disinfection, Water Quality Control, and Safety Practices in 1978 in the United States, J. Amer. Water Works Association, January 1983, pp. 51-56 at 55.) Ammoniation to form primarily monochloramines as carriers for the chlorine sanitizing agent is provided in some cities where long distances are involved. Where such treatment is provided, care is exercised to prevent the formation of di- and trichloramines by careful monitoring of the chlorine/ammonia ratio. Addition of $OCl^-$ ions to such water supplies allows for further reaction of the monochloramine to di- and trichloramines.

Tests were conducted using aged TCICA solutions. Two dyes were compared: Hidacid Azure Blue (C.I. Dye No. 42,090) and C.I. Dye No. 52,035. In these tests the concentration of $OCl^-$ as available chlorine was elevated as to increase the rate of any reaction (and thus reduce the length of the experiment). Color changes were visually recorded. The results and test conditions are shown in Table I-A through Table I-D. The TCICA solutions were aged for about 24 to 48 hours.

TABLE I

Effect of Aged TCICA Solutions

Visual Color Observation

| Time | pH | | | |
|---|---|---|---|---|
| (min.) | 6 | 7 | 8 | 9 |
| A. $OCl^-$ Concentration = 11.4 ppm as available chlorine; Dye: Hidacid Azure Blue (67% Active C.I. Dye No. 42,090); Dye concentration = 1 ppm as is | | | | |
| 0 | blue | blue | blue green | blue green |
| 1 | | | lime green | |
| 2 | | | yellow green | lime green |
| 3 | | blue green | yellow orange | |
| 4 | | blue green | | |
| 5 | blue | | | |
| 6 | blue green | | | |

TABLE I-continued

Effect of Aged TCICA Solutions

Visual Color Observation

| Time | pH | | | |
|---|---|---|---|---|
| (min.) | 6 | 7 | 8 | 9 |
| 10 | | | | orange yellow |
| 11 | | | orange yellow | |
| 12 | | blue green | | |
| 13 | | | | colorless |
| 14 | blue green | | light orange | |
| 15 | | green | | |
| 17 | blue green | | | |
| 18 | | | | colorless |
| 19 | | | light orange | |
| 20 | | light green | | |
| 22 | green | | | |
| 29 | | | | colorless |
| 30 | | | yellow | |
| 31 | | light gray green | | |
| 33 | gray green | | | |
| B. $OCl^-$ concentration = 11.4 ppm as available chlorine; Dye: Colour Index Dye No. 52,035 (60% active dye); Dye concentration = 3 ppm as is | | | | |
| 0 | blue | blue | blue | blue |
| 1 | blue | | blue | |
| 3 | | blue | | blue green |
| 4 | blue | | blue | |
| 7 | | blue | | blue green |
| 8 | blue | | blue | |
| 10 | | blue | | blue green |
| 11 | blue | | blue | |
| 18 | | blue green | | green blue |
| 19 | blue | | blue green | |
| 25 | | light blue | | slightly green blue |
| 26 | blue | | light blue | |
| 50 | | light blue | | slightly green blue |
| 51 | blue | | light blue | |
| C. $OCl^-$ concentration = 57. ppm; Dye: Hidacid Azure Blue (67% active C.I. Dye No. 42,090); Dye concentration = 2 ppm as is | | | | |
| 0 | blue | blue | blue | green yellow |
| 0.5 | | | | |
| 1 | blue green | | | |
| 1.5 | | | green | |
| 2 | | blue green | | |
| 3 | blue green | | | |
| 3.5 | | green | | |
| 4 | | | yellow orange | yellow |
| 4.5 | green | | | |
| 5 | | | orange | light yellow |
| 6 | | | orange | |
| 7 | | lime green | | very light yellow |
| 8 | green | yellow | orange | |
| 9 | lime green | | | |
| 10 | | yellow | | |
| 11 | light yellow green | | | |
| 19 | | | | very light yellow |
| 20 | | | light gray orange | |
| 22 | | yellow orange | | |
| 23 | yellow orange | | | |

D. $OCl^-$ concentration = 57.0 ppm as available chlorine
Dye: Colour Index Dye No. 52,035 (60% active dye)

TABLE I-continued

Effect of Aged TCICA Solutions

| Time (min.) | Visual Color Observation pH 6 | 7 | 8 | 9 |
|---|---|---|---|---|
| Dye concentration = 6 ppm as is | | | | |
| 0 | blue | blue | blue | blue |
| 1 | blue | blue | | blue green |
| 2 | blue | | blue | |
| 3 | | blue | | |
| 4 | blue | blue | | |
| 5 | blue | | | |
| 6 | | | blue | blue green |
| 7 | | blue | | |
| 8 | blue | | blue gray | blue green |
| 9 | | blue gray | | |
| 10 | blue gray | | blue gray | |
| 11 | | blue gray | blue gray | green |
| 12 | blue | | | |
| 13 | | | blue gray | |
| 14 | | blue gray | green | |
| 15 | blue gray | | | |
| 16 | | | gray green | |
| 17 | | lighter blue gray | | |
| 18 | blue gray | | | |
| 22 | | | | colorless |
| 24 | | | colorless | |
| 25 | | lighter blue green | | |
| 26 | blue green | | | |
| 29 | | | | colorless |
| 31 | | | colorless | |
| 32 | | light green | | |
| 33 | blue green | | | |
| 54 | | | | faint green |
| 56 | | | colorless | |
| 57 | | colorless | | |
| 58 | light blue | | | |

In the Tables I A-D a broken line separates those observations wherein some blue tint remains from those where there is a complete loss of blue tint. It is seen that C.I. Dye No. 52,035, the thiazine dye of the present invention, retained at least some blue tint far longer than the Hidacid Azure Blue dye in the pH range of 6 to 9. Indeed, the loss of blue color for Hidacid Azure Blue in Table I-A at pH values of 8 and 9 occurred within 1 to 2 minutes of mixing, while in Table I-B, for the same $OCl^-$ concentration, at least some blue tint was perceived from the thiazine dye even at about 50 minutes into the test, for pH values of 8 and 9.

Similarly, the tests at an $OCl^-$ concentration of 57 ppm, a very high concentration far in excess of the level required for effective disinfecting in the bowl, the thiazine dye, C.I. Dye No. 52,035, provided a blue tint or hue far longer than the Hidacid Azure Blue dye. Furthermore, in Tables I-A and I-C, it is seen that the Hidacid Azure Blue dye undergoes repeated color changes at pH values of 8 and 9 from blue green to green to yellow and to orange.

The color changes that occur in the aged TCICA solutions when Hidacid Azure Blue is the subject dye were found not to occur with freshly prepared TCICA solutions. It is believed that the various N-chloro species attacked the triarylmethane dye, the dye also being oxidized by the hypochlorite ions. In view of these observations, it is believed that C.I. 42,090 dyes have secondary nonblue absorbances, which secondary absorbances are either not present in C.I. Dye No. 52,035 or are not similarly susceptible to attack. Formation of the various N-chloro species in TCICA solutions to concentrations that affect dye color occurs after several hours, with equilibrium being reached after about 6 to about 24 hours, depending on such factors as solution temperature, pH, and reactant concentrations.

Table II provides further data comparing Hidacid Azure Blue (C.I. Dye No. 42,090) and C.I. Dye No. 52,035. In these experiments absorbance was measured at maximum wavelengths on a Perkin-Elmer 559 UV-Vis spectrophotometer, with a second absorbance reading at lower wave length. For Hidacid Azure Blue, $\lambda_{max}=626$ nm and $\lambda'=520$ nm; for C.I. Dye No. 52,035 $\lambda_{max}=657$ nm, while $\lambda'=610$ nm. Because color intensity was to be equal, the Hidacid Azure Blue dye concentration was set at 1.0 ppm and the Colour Index Dye No. 52,035 concentration was set at 2.0 ppm, on an as is basis. In both instances the $OCl^-$ concentration (for freshly prepared TCICA solution) was 5.0 ppm available chlorine.

TABLE II

Absorbance in TCICA Solutions as a Function of pH

| | Hidacid Azure Blue Absorbance, A | | | | | | C.I. Dye No. 52,035 Absorbance, A | | | | | |
|---|---|---|---|---|---|---|---|---|---|---|---|---|
| | pH | | | | | | | | | | | |
| Time | 6 | | 7 | | 8 | | 6 | | 7 | | 8 | |
| (min.) | $\lambda_{max}$ | $\lambda'$ | $\lambda_{max}$ | $\lambda'$ | $\lambda_{max}$ | $\lambda'$ | $\lambda_{max}$ | $\lambda'$ | $\lambda_{max}$ | $\lambda'$ | $\lambda_{max}$ | $\lambda'$ |
| 0 | 0.109 | 0.010 | 0.112 | 0.010 | 0.107 | 0.007 | 0.110 | 0.056 | 0.109 | 0.056 | 0.100 | 0.059 |
| 10 | 0.031 | 0.017 | 0.056 | 0.011 | 0.076 | 0.012 | 0.112 | 0.050 | 0.102 | 0.048 | 0.112 | 0.049 |
| 60 | 0.013 | 0.012 | 0.029 | 0.011 | 0.050 | 0.010 | 0.068 | 0.038 | 0.064 | 0.025 | 0.088 | 0.040 |
| 120 | 0.014 | 0.016 | 0.023 | 0.012 | 0.050 | 0.018 | 0.046 | 0.032 | 0.043 | 0.022 | 0.084 | 0.048 |
| | % Fade at $\lambda_{max} = (A_o - A_t)/A_o$ | | | | | | % Fade at $\lambda_{max} = (A_o - A_t)/A_o$ | | | | | |
| 0 | 0 | | 0 | | 0 | | 0 | | 0 | | | |
| 10 | 71.6 | | 50.0 | | 28.9 | | 0 | | 6.4 | | 0 | |
| 60 | 88.1 | | 74.1 | | 53.3 | | 38.2 | | 41.3 | | 12.0 | |
| 120 | 87.2 | | 79.5 | | 53.3 | | 58.2 | | 60.6 | | 16.0 | |
| | Ratio, (A at $\lambda_{max}$)/(A at $\lambda'$) | | | | | | Ratio, (A at $\lambda_{max}$)/(A at $\lambda'$) | | | | | |
| 0 | 10.9 | | 11.2 | | 15.3 | | 1.96 | | 1.98 | | 1.69 | |
| 10 | 1.8 | | 5.1 | | 6.3 | | 2.24 | | 2.12 | | 2.29 | |
| 60 | 1.1 | | 2.6 | | 5.0 | | 1.79 | | 2.56 | | 2.20 | |
| 120 | 0.9 | | 1.9 | | 2.8 | | 1.44 | | 1.95 | | 1.75 | |

In these freshly prepared TCICA solutions, it is seen that C.I. Dye No. 52,035 fades substantially less rapidly. The absorbance at λ' indicates the presence of secondary chromophores, while the absorbance at $\lambda_{max}$ is for the visible blue spectrum. Hence, the ratio of absorbance at $\lambda_{max}$ to absorbance at λ' is an indication of the relative intensity of blue to nonblue. It is seen that for Hidacid Azure Blue the ratios decrease rapidly with time, while the ratios for C.I. Dye No. 52,035 do not. Indeed, for C.I. Dye No. 52,035 the ratios throughout the time period are of the same order of magnitude. While the value of the ratio does not indicate whether a color change has occurred, a value of the ratio decreasing with time indicates that a dye is susceptible to a color change. It is seen that the ratio decreases substantially for the Hidacid Azure Blue dye. It may also be observed in Table II that the decrease in absorption measured at $\lambda_{max}$ over time is less for C.I. Dye No. 52,035 than for Hidacid Azure Blue. Moreover, it is seen that absorption measured at λ' for Hidacid Azure Blue is increasing slightly or almost constant, while for C.I. Dye No. 52,035 absorbance at λ' decreases slightly. Thus, the secondary absorbances of C.I. Dye No. 52,035 do not contribute to the overall color observed over time as in the case of Hidacid Azure Blue dye. It is believed that the presence of nitrogen-containing compounds and/or ammonium ions in solution speed up the loss of blue absorption for Hidacid Azure Blue while not reducing secondary absorptions, thus allowing these secondary absorbances to become more prominent color providers. It is also possible that new chromophoric compounds are obtained contributing to the color shifting phenomenon. It is further believed that in the presence of nitrogen-containing compounds and/or ammonium ions, either the blue absorptions of the C.I. Dye No. 52,035 are not as rapidly attacked, or that competing reactions occur with respect to both the blue and nonblue absorptions. In any event, the effect with Colour Index Dye No. 52,035 is to provide a blue tint or hue less likely to exhibit continuously shifting color transitions.

With respect to C.I. Dye No. 52,035, it is seen from Table II-B and II-D that shifting to blue/green, to blue/grey and to green did occur. It is suspected that the green tinge of color associated with certain samples is occasioned by a absorbance of yellow wavelengths, which in combination with blue produces green. While not preferred, shifting to blue/green and green observed with C.I. Dye No. 52,035, which does occur under certain conditions, is less disadvantageous than shifting to yellow, orange, pink, and other tints or hues. As a criterion, the C.I. Dye No. 52,035 should not produce any nonblue chromophores below a wavelength of less than about 570 nm.

FIGS. 1-4 illustrate the effect after 20 minutes of ammonium ion concentration on loss of color for equal intensity solutions of Hidacid Azure Blue (C.I. Dye No. 42,090) and C.I. Dye No. 52,035 at pH values of 6, 7, 8, and 9. For each solution the hypochlorite source is calcium hypochlorite and is in a concentration of 5 ppm available chlorine. The ammonium source is ammonium sulfate, and readings were obtained at ammonia concentrations of 0, 0.05, 0.125, 0.63, 1.25 and 5 ppm. Absorbance was measured on a Perkin-Elmer 559 UV-Vis spectrophotometer. The as is Hidacid Azure Blue dye concentration was 1.0 ppm in all tests, while the as is C.I. Dye No. 52,035 dye concentration was 2.0 ppm, which levels provided equal initial intensity in respective aqueous solutions.

In the Figures the ordinate is ammonium ion concentration measured as $NH_3$, while the abscissa is the percent absorbance at the end of 20 minutes. A value of 100% absorbance (ordinate max=0.110) indicates that no color loss has occurred as compared to the original solution, while a 0% absorbance would indicate total loss of color. Absorbance readings were taken at $\lambda_{max}=626$ nm for Hidacid Azure Blue and $\lambda_{max}=660$ nm for C.I. Dye No. 52,035. These absorbance readings, however, do not provide any information with respect to change in color. Rather, they only provide comparative data as to the intensity of whatever color remains, and to this extent are a measure of the relative reactivity of the respective dyes. In these Figures an $NH_3$ concentration of zero has been plotted as 0.000001 ppm.

Referring to FIG. 1, it is seen that at pH=6, the C.I. Dye No. 52,035 has greater intensity throughout the $NH_3$ concentration range of 0 to about 5 ppm. It is also seen that there is a definite decrease in intensity for Hidacid Azure Blue in the range of from about 0.001 to about 2 ppm $NH_3$. At 5 ppm $NH_3$, the intensity of the Hidacid Azure Blue solution is actually greater than at 0 ppm $NH_3$, but still less than for C.I. Dye No. 52,035. With respect to C.I. Dye No. 52,035, a similar decrease in intensity is observed, but over the smaller range of about 0.63 to about 2.5 ppm $NH_3$, which lowering of intensity attributable to ammonia is far less than for Hidacid Azure Blue.

Figure 2:
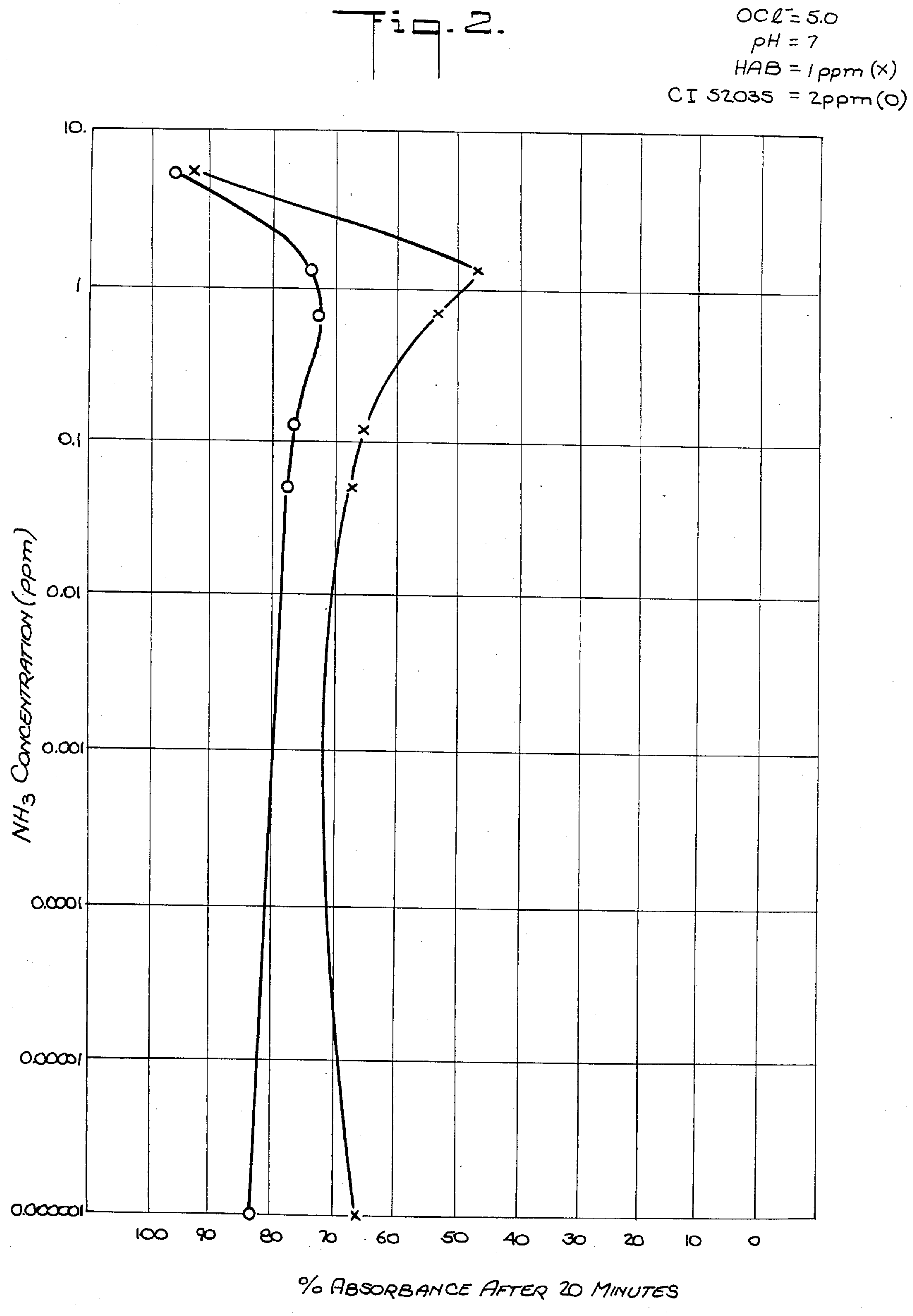
Figure 3:
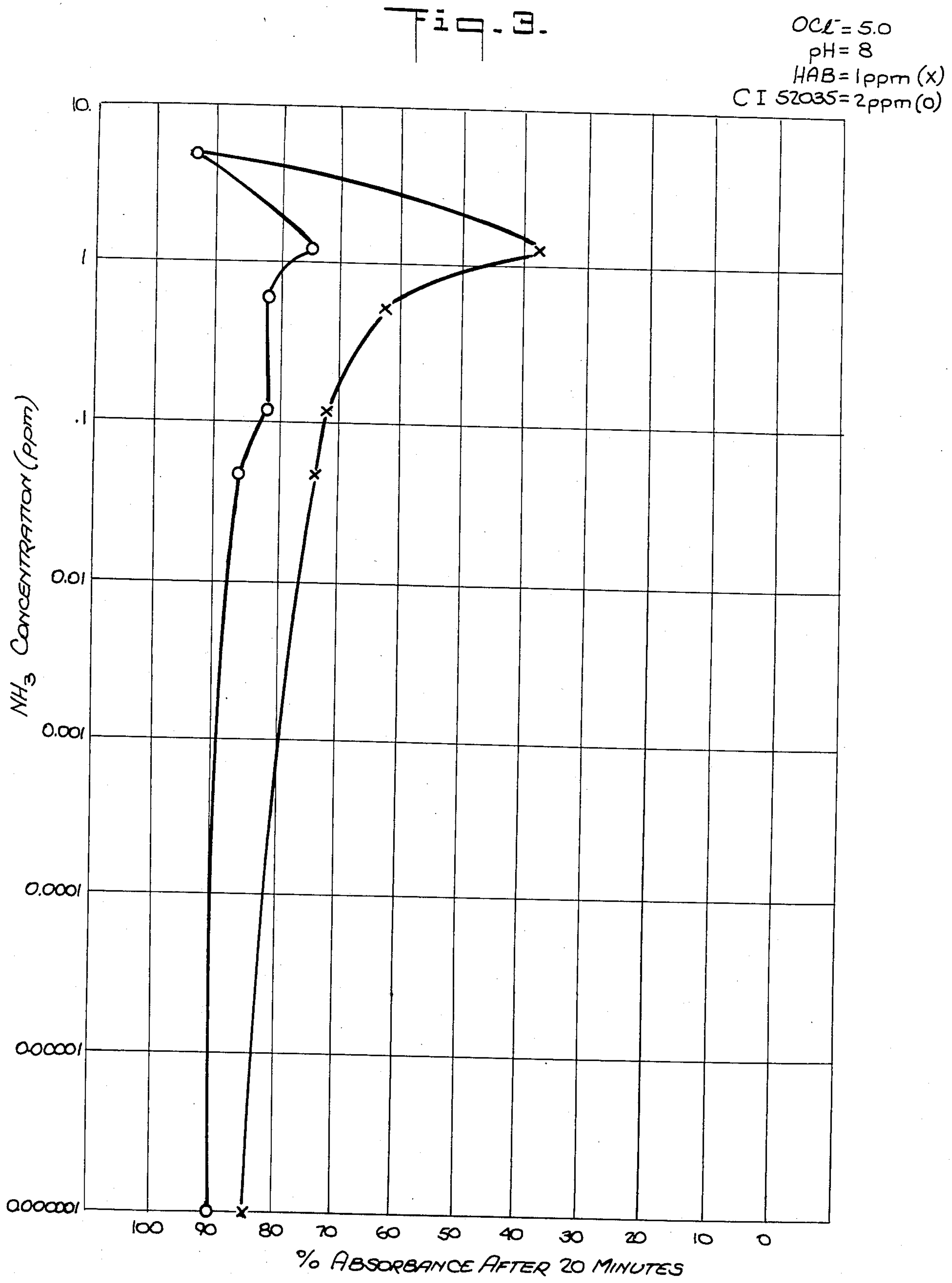
Figure 4:
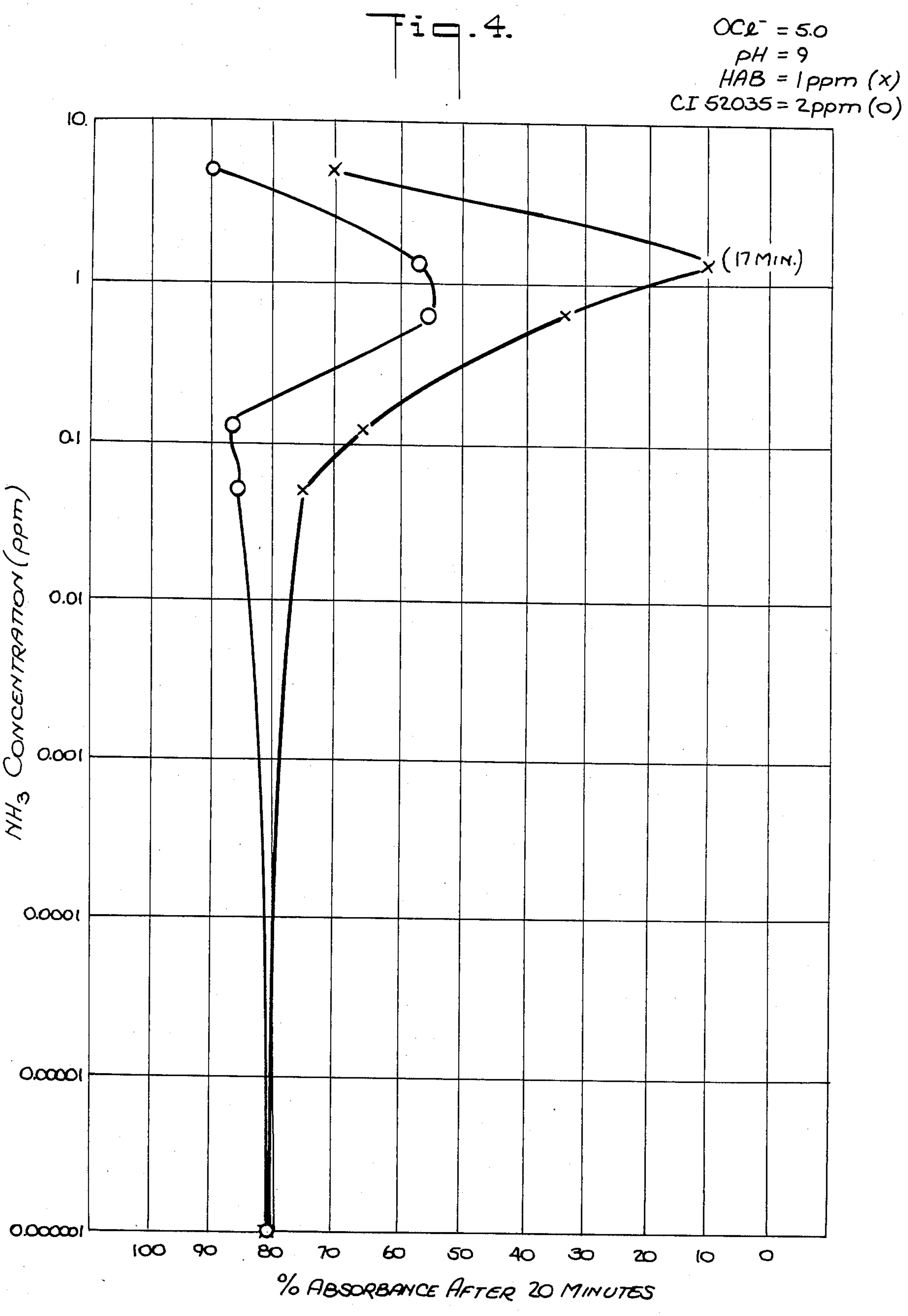

Referring to FIGS. 2-4, it is seen that both dyes exhibit relatively constant and similar intensity in the range below about 0.1 ppm $NH_3$, although the intensity of C.I. Dye No. 52,035 after 20 minutes is about 10 to 15% higher. Above about 0.1 ppm $NH_3$, it is seen that its presence affects the Hidacid Azure Blue dye more strongly, and that a concentration of 5.0 ppm $NH_3$ apparently stabilizes the solution.

Color changes of the dye Hidacid Azure Blue to orange, lilac, and yellow have been observed at a molar ratio of available chlorine to ammonium ions of about 4:1, in solutions containing 5 ppm $OCl^-$ ions and 1 ppm as is dye. At such a ratio of $OCl^-$ to $NH_4^+$, the kinetics of the system appear to favor formation of di- and trichloramines, which are more reactive than monochloramines. Such color changes were not observed with respect to Colour Index Dye No. 52,035 over hypochlorite ion to ammonium ion molar ratios of from 25:1 to 1:4 at pH values of between 6 to 9, although in some instances blue/green, blue/grey and green blues were observed, as with the aged TCICA solutions. Preferably, the molar ratio of hypochlorite ion to ammonium ion is in the range of from 20:1 to 2:1.

BCDMH has the structure

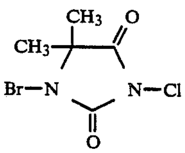

It is believed that removal of the chlorine exposes a negatively charged nitrogen, the chlorine reacting with water to generate a hypochlorite ion, which then reacts with the hydantoin ring to liberate an amine species, and form an ammonium ion. The ammonium ion then reacts to form mono-, di- and trihaloamines. Alternatively, the haloamines may form without the formation of the intermediate amine species. It has been observed that freshly prepared BCDMH solutions cause Hidacid Azure Blue dye to undergo a transition to purple. It is believed that the formation of hypobromite ions causes this color transition.

Solutions containing 5 ppm BCDMH measured as available bromine and 2 ppm (as is) C.I. Dye No. 52,035 were prepared. Similar solutions containing 1 ppm Hidacid Azure Blue (as is) were also prepared. pH was adjusted with calcium carbonate buffer. Color observations are recorded in Table III.

TABLE III

| Time (min.) | Observed Color at pH 6 | 7 | 8 | 9 |
|---|---|---|---|---|
| | C.I. Dye No. 52,035 | | | |
| 2 | grey blue | grey blue | blue green | blue green |
| 7 | grey blue | grey blue | blue green | blue green |
| 62 | grey blue | grey blue | grey blue | blue green |
| 206 | light grey blue | light grey blue | light grey blue | slight grey blue |
| | Hidacid Azure Blue | | | |
| 1 | light purple | grey blue | blue grey | |
| 7 | slight purple | light purple | blue grey | |
| 19 | slight purple | light purple | light purple | blue grey |
| 25 | light grey blue | slight purple | slight purple | grey blue |
| 67 | clear purple | slight purple | slight purple | slight |

In Table IV absorbance data similar to Table II is provided. Absorbance is measured at $\lambda_{max}=626$ nm and at $\lambda'=520$ nm for Hidacid Azure Blue, and at $\lambda_{max}=657$ nm and $\lambda'=610$ nm for C.I. Dye No. 52,035. The Hidacid Azure Blue solution contained 1 ppm as is dye, while the C.I. Dye No. 52,035 dye contained 2 ppm (as is) dye, both solutions being of equal initial color intensity. The BCDMH concentration in each was 5 ppm measured as available bromine.

TABLE IV

| Absorbance in BCDMH Solutions as a Function of pH | | | | | | | | | | | | |
|---|---|---|---|---|---|---|---|---|---|---|---|---|
| | Hidacid Azure Blue Absorbance, A | | | | | | C.I. Dye No. 52,035 Absorbance, A | | | | | |
| | pH | | | | | | | | | | | |
| Time | 6 | | 7 | | 8 | | 6 | | 7 | | 8 | |
| (min.) | $\lambda_{max}$ | $\lambda'$ | $\lambda_{max}$ | $\lambda'$ | $\lambda_{max}$ | $\lambda'$ | $\lambda_{max}$ | $\lambda'$ | $\lambda_{max}$ | $\lambda'$ | $\lambda_{max}$ | $\lambda'$ |
| 0 | 0.073 | 0.013 | 0.084 | 0.011 | 0.100 | 0.010 | 0.098 | 0.052 | 0.096 | 0.048 | 0.102 | 0.051 |
| 10 | 0.021 | 0.021 | 0.021 | 0.022 | 0.041 | 0.017 | 0.065 | 0.043 | 0.064 | 0.040 | 0.091 | 0.046 |
| 60 | 0.017 | 0.016 | 0.020 | 0.022 | 0.022 | 0.025 | 0.039 | 0.043 | 0.048 | 0.039 | 0.089 | 0.047 |
| 120 | 0.012 | 0.014 | 0.014 | 0.017 | 0.018 | 0.019 | 0.034 | 0.042 | 0.042 | 0.037 | 0.086 | 0.046 |
| | % Fade at $\lambda_{max} = (A_o - A_t)/A_o$ | | | | | | % Fade at $\lambda_{max} = (A_o - A_t)/A_o$ | | | | | |
| 0 | 0 | | 0 | | 0 | | 0 | | 0 | | 0 | |
| 10 | 71.2 | | 75.0 | | 59.0 | | 33.7 | | 33.3 | | 10.8 | |
| 60 | 76.7 | | 76.2 | | 78.0 | | 60.2 | | 50.0 | | 12.8 | |
| 120 | 83.6 | | 83.3 | | 82.0 | | 65.3 | | 56.3 | | 15.7 | |
| | Ratio, (A at $\lambda_{max}$)/(A at $\lambda'$) | | | | | | Ratio, (A at $\lambda_{max}$)/(A at $\lambda'$) | | | | | |
| 0 | 5.61 | | 7.64 | | 10.0 | | 1.88 | | 2.00 | | 2.00 | |
| 10 | 1.00 | | 0.95 | | 2.41 | | 1.53 | | 1.60 | | 1.98 | |
| 60 | 1.06 | | 0.91 | | 0.88 | | 0.91 | | 1.23 | | 1.89 | |
| 120 | 0.86 | | 0.82 | | 0.95 | | 0.81 | | 1.14 | | 1.87 | |

Again, it is seen that in th BCDMH solutions of Table III, the percent fade for Colour Index Dye No. 52,035 is considerably less than for Hidacid Azure Blue, especially at pH 7 and pH 8. Moreover, the ratio of absorbance at $\lambda_{max}$ to absorbance at $\lambda'$ is more constant throughout the pH values under consideration, and especially at pH 7 and pH 8.

We claim:

1. A method of cleaning a toilet having a tank and a bowl with a hypohalite disinfectant agent each time the tank is flushed, and providing the bowl water with a dye resistant to attack by the disinfectant agent, said method comprising the step of codispensing from separate product chambers into the tank water for retention in the bowl water a first solution containing a hypohalite ion releasing agent selected from the group consisting of 1,3-dibromo-5,5-dimethylhydantoin, 1,3-dichloro-5,5-dimethylhydantoin, 1-bromo-3-chloro-5,5-dimethylhydantoin, dichloroisocyanuric acid and its potassium and sodium salts, and trichloroisocyanuric acid, and a second solution containing a dye which is Colour Index Dye No. 52,035, the concentration of hypohalite ions in the bowl water after a flush being from about 2 to about 15 ppm available chlorine and the concentration of the dye on an active basis being from about 0.1 to about 5.0 ppm, the weight ratio of available chlorine to active dye being from about 1:1 to about 20:1.

2. The method of claim 1 wherein the pH of the bowl water is between about 6.5 to 10 after delivery of the solutions.

3. The method of claim 2 wherein the weight ratio of available chlorine to active dye in the bowl water after a flush is from about 3:1 to 12:1.

4. The method of claim 2 wherein the disinfectant is selected from the group consisting of dichloroisocyanuric acid, its potassium salt, or its sodium salts.

5. The method of claim 2 wherein the disinfectant is 1,3-dichloro-5,5-dimethylhydantoin.

6. The method of claim 2 wherein the disinfectant is 1-bromo-3-chloro-5,5-dimethylhydantoin.

7. The method of claim 2 wherein the disinfectant is trichloroisocyanuric acid.

8. The method of claim 7 wherein the concentration of disinfectant in the bowl water after a flush is from about 4 to about 10 ppm available chlorine and the concentration of dye in the bowl water after a flush is from about 0.3 to about 1.0 ppm.

9. The method of claim 8 wherein the tank water supplied to the tank contains ammonium ions, the molar ratio of available chlorine to ammonium ion concentration in the bowl water after a flush being from about 20:1 to about 2:1.

10. The method of claim 9 wherein the disinfectant agent comprises from about 2 to about 6 parts trichloroisocyanuric acid and one part cyanuric acid.

11. A method of cleaning a toilet having a tank and a bowl with a hypohalite disinfectant agent each time the tank is flushed, the tank being supplied with water having an ammonium ion concentration of 0.05 to 2.5 ppm as free ammonia, and providing the bowl water with a dye resistant to attack in the presence of hypochlorite and ammonium ions, said method comprising the step of codispensing from separate product chambers therefor into the tank water for delivery to the bowl, a first cleaning solution containing a hypohalite ion releasing agent and a second cleaning solution containing the dye Colour Index Dye No. 52,035, the concentration of the hypochlorite ions in the bowl water after a flush being from about 2 to about 15 ppm and the concentration of the dye in the bowl water on an active basis being from about 0.1 to about 5.0 ppm, the weight ratio of the available chlorine to dye being from about 1:1 to about 20:1 and the bowl water concentration of the ammonium ions after a flush being from about 0.05 to about 2.5 ppm free ammonia.

12. The method of claim 11 wherein the bowl water pH after delivery of the solution is between about 6.5 to 10.

13. The method of claim 12 wherein the concentration of disinfectant in the bowl water after a flush is from about 4 to 10 ppm available chlorine and the concentration of dye is from about 0.3 to about 1.0 ppm.

14. The method of claim 12 wherein the weight ratio of available chlorine to active dye after a flush from about 3:1 to about 12:1.

15. The method of claim 12 wherein the disinfectant is selected from the group consisting of 1,3-dibromo-5,5-dimethylhydantoin, 1,3-dichloro-5,5-dimethylhydantoin, 1-bromo-3-chloro-5,5-dimethylhydantoin, dichloroisocyanuric acid and its potassium and sodium salts, and trichloroisocyanuric acid.

16. The method of claim 12 wherein the disinfectant is selected from the group consisting of calcium hypochlorite and lithium hypochlorite.

17. The method of claim 16 wherein the disinfectant is trichloroisocyanuric acid.

18. The method of claim 17 wherein the disinfectant comprises from about 2 to about 4 parts trichloroisocyanuric acid and one part cyanuric acid.

19. A method of adding to the bowl water of a flush toilet a dye not substantive to porcelain and an effective disinfecting concentration of a disinfectant agent, the dye providing a blue tint or hue in the bowl water, the blue tint or hue thus provided being resistant to attack by the disinfectant agent in the presence of ammonium ions from the water supply, said method comprising the step of codispensing from separate product chambers therefor into the tank for delivery to the bowl a first solution containing a hypochlorite ion-releasing agent and a second solution containing the dye Colour Index Dye No. 52,035, the concentration of the hypochlorite ions in the bowl water after a flush being from about 2 to about 15 ppm and the concentration of the dye in the bowl water on an active dye basis being from about 0.1 to about 5.0 ppm, the weight ratio of available chlorine to dye after a flush being from about 1:1 to about 20:1, and the ammonium ion concentration of the water after a flush being from about 0.05 to about 2.5 ppm free ammonia, said blue tint or hue of the bowl water being retained for 30 minutes or longer with no nonblue absorbances visually detectable below a wavelength of less than about 570 nm.

20. The method of claim 19 wherein the pH of the bowl water after a flush is between 6.5 and 10.

21. The method of claim 20 wherein the weight ratio of available chlorine to active dye after a flush is from about 3:1 to about 12:1.

22. The method of claim 21 wherein the disinfectant is selected from the group consisting of calcium hypochlorite, lithium hypochlorite, and mixtures thereof.

23. The method of claim 21 wherein the disinfectant is trichloroisocyanuric acid.

24. The method of claim 21 wherein the disinfectant is from 2 to 4 parts trichloroisocyanuric acid and 1 part cyanuric acid.

25. An in-tank toilet-cleaning article, said article, when placed in a tank of a flush toilet, alternately filling and emptying in response to changes in water level of the tank occasioned by a flush, wherein water supplied to the tank has an ammonium ion concentration of from about 0.05 to about 2.55 ppm measured as free ammonia, the article comprising a first product chamber containing a first cleaning composition, said first cleaning composition including a dye which is Colour Index Dye No. 52,035, and a second product chamber containing a second cleaning composition, said second cleaning composition containing a disinfectant releasing in aqueous solution hypochlorite ions, said first and second product chambers each having means through which water enters the chambers and through which solutions of the first and second cleaning compositons are separately codispensed, said solutions being formed in their respective chambers in the quiescent period between flushes by partial dissolution of the compositions, said first and second product chambers codispensing amounts of said solutions effective to provide in bowl water after a flush an available chlorine concentration of the disinfectant of from about 2 to 15 ppm and a concentration of the dye on an active basis of from about 0.1 to 5.0 ppm, the weight ratio of available chlorine to active dye being from about 1:1 to about 20:1 and the ammonium ion concentration in bowl water after a flush being from about 0.05 to about 2.5 ppm.

26. The article of claim 25 wherein the disinfectant is selected from the group consisting of calcium hypochlorite and lithium hypochlorite.

27. The article of claim 25 wherein the disinfectant is trichloroisocyanuric acid.

28. The article of claim 25 wherein the second cleaning composition comprises between 2 to 4 parts trichloroisocyanuric acid and 1 part cyanuric acid.

29. An in-tank toilet-cleaning article, said article, when placed in a tank of a flush toilet, alternately filling and emptying in response to changes in the tank water level occasioned by a flush, the article comprising a first product chamber containing a first cleaning composition, said first cleaning composition including a dye which is Colour Index Dye No. 52,035, and a second product chamber containing a second cleaning composition, said second cleaning composition including a disinfectant selected from the group consisting of 1,3-dibromo-5,5-dimethylhydantoin, 1,3-dichloro-5,5-dimethylhydantoin, 1-bromo-3-chlor-5,5-dimethylhydanton, dichloroisocyanuric acid and its sodium and potassium salts, and trichloroisocyanuric acid, said first and second product chambers each having means through which water enters the chambers and through which solutions of the first cleaning and second cleaning compositions are separately codispensed, said solutions being formed in their respective product chambers in the quiescent period between flushes by partial dissolution of said compositions, said first and second product chambers codispensing amounts of said solutions effective to provide in bowl water after a flush an available chlorine concentration of the disinfectant of from about 2 to about 15 ppm and a concentration of the dye on an active basis of from about 0.1 to 5.0 ppm, the weight ratio of available chlorine to active dye being from about 1:1 to about 20:1.

30. The article of claim 29 wherein the disinfectant is selected from the group consisting of dichloroisocyanuric acid, its sodium salts, or its potassium salts.

31. The article of claim 29 wherein the disinfectant is 1,3-dichloro-5,5-dimethylhydantoin.

32. The article of claim 29 wherein the disinfectant is 1-bromo-3-chloro-5,5-dimethylhydantoin.

33. The article of claim 29 wherein the disinfectant is trichloroisocyanuric acid.

34. The article of claim 29 wherein the second cleaning compostion comprises between 2 to 4 parts trichloroisocyanuric and one part cyanuric acid.

* * * * *